US008358572B2

(12) United States Patent
Van Lydegraf et al.

(10) Patent No.: US 8,358,572 B2
(45) Date of Patent: Jan. 22, 2013

(54) DATA STORAGE DEVICE

(75) Inventors: Curt N. Van Lydegraf, Eagle, ID (US);
Donald J. Fasen, Boise, ID (US);
Richard L. Hilton, Boise, ID (US)

(73) Assignee: Samsung Electronics Co., Ltd. (KR)

( * ) Notice: Subject to any disclaimer, the term of this patent is extended or adjusted under 35 U.S.C. 154(b) by 2380 days.

(21) Appl. No.: 11/146,790

(22) Filed: Jun. 7, 2005

(65) Prior Publication Data
US 2006/0274629 A1    Dec. 7, 2006

(51) Int. Cl.
*G11B 9/00* (2006.01)
(52) U.S. Cl. .................... 369/126; 369/127; 369/101
(58) Field of Classification Search .................. None
See application file for complete search history.

(56) References Cited

U.S. PATENT DOCUMENTS

| 5,557,596 A | 9/1996 | Gibson et al. | |
| 6,195,313 B1 * | 2/2001 | Seki et al. | 369/126 |
| 2003/0218960 A1 * | 11/2003 | Albrecht et al. | 369/126 |
| 2004/0047275 A1 * | 3/2004 | Cherubini et al. | 369/126 |
| 2006/0182004 A1 * | 8/2006 | Maeda et al. | 369/126 |

FOREIGN PATENT DOCUMENTS

| JP | 06162581 A | * | 6/1994 |
| JP | 08087731 A | * | 4/1996 |

* cited by examiner

*Primary Examiner* — Adam R Giesy
(74) *Attorney, Agent, or Firm* — Myers Bigel Sibley & Sajovec

(57) ABSTRACT

A data storage device includes a first read mechanism, a second read mechanism, and a data storage medium movable with respect to the first read mechanism and the second read mechanism. A first reference patch containing reference bits is positioned near a first corner of the data storage medium. The first read mechanism is configured to read the reference bits of the first reference patch and the second read mechanism is configured to read the reference bits of a second reference patch. The storage device also includes a controller configured to determine whether the first read mechanism and the data storage medium are offset with respect to each other based upon the reference bits read by the first read mechanism and the reference bits read by the second mechanism.

22 Claims, 9 Drawing Sheets

DATA STORAGE DEVICE

BACKGROUND

Electronic storage devices have the capability to store information in electronic form. These devices typically include a media for storing the information and some form of read and write mechanisms for reading information from the media and writing information to the media, respectively. The devices also include a system for identifying locations on media where information may be read or written.

To store information, a storage device generally positions its write mechanism relative to the location on the media where the information is to be written. The write mechanism then causes the information to be stored. For the storage device to operate properly, the device needs to be able to read the stored information. In other words, the device needs to be able to reliably return a read mechanism to the location on the media where the information was stored. Otherwise, information that is written to the device may be not be retrieved from the media.

One type of storage device is a memory module that includes one or more micro-movers, that is, movers, that use springs to move a media relative to a plurality of read and write mechanisms. As the movers move the media, the read and write mechanisms read from or write to the media at designated locations. As with storage devices generally, a memory module needs to be able to accurately position its read and write mechanisms to allow information to be retrieved reliably. However, when the storage device is subjected to heat, cold, moisture, or other environmental conditions, various sections of the storage device are prone to exhibit different rates of expansion or contraction. As such, the memory module is likely to be unable to position its read and write mechanisms accurately when such expansion or contraction occurs.

It would thus be beneficial to have a storage device capable of accurately reading and writing data bits even when the storage device has undergone dimensional changes.

SUMMARY

A data storage device is disclosed herein. The storage device includes a first read mechanism, a second read mechanism, and a data storage medium movable with respect to the first read mechanism and the second read mechanism. A first reference patch containing reference bits is positioned near a first corner of the data storage medium. The first read mechanism is configured to read the reference bits of the first reference patch. The second read mechanism is configured to read a second reference patch containing reference bits. The storage device also includes a controller configured to determine whether the first read mechanism and the data storage medium are offset with respect to each other based upon the reference bits read by the first read mechanism and the reference bits read by the second mechanism.

BRIEF DESCRIPTION OF THE DRAWINGS

Features of the present invention will become apparent to those skilled in the art from the following description with reference to the figures, in which.

DETAILED DESCRIPTION

Figure 1:
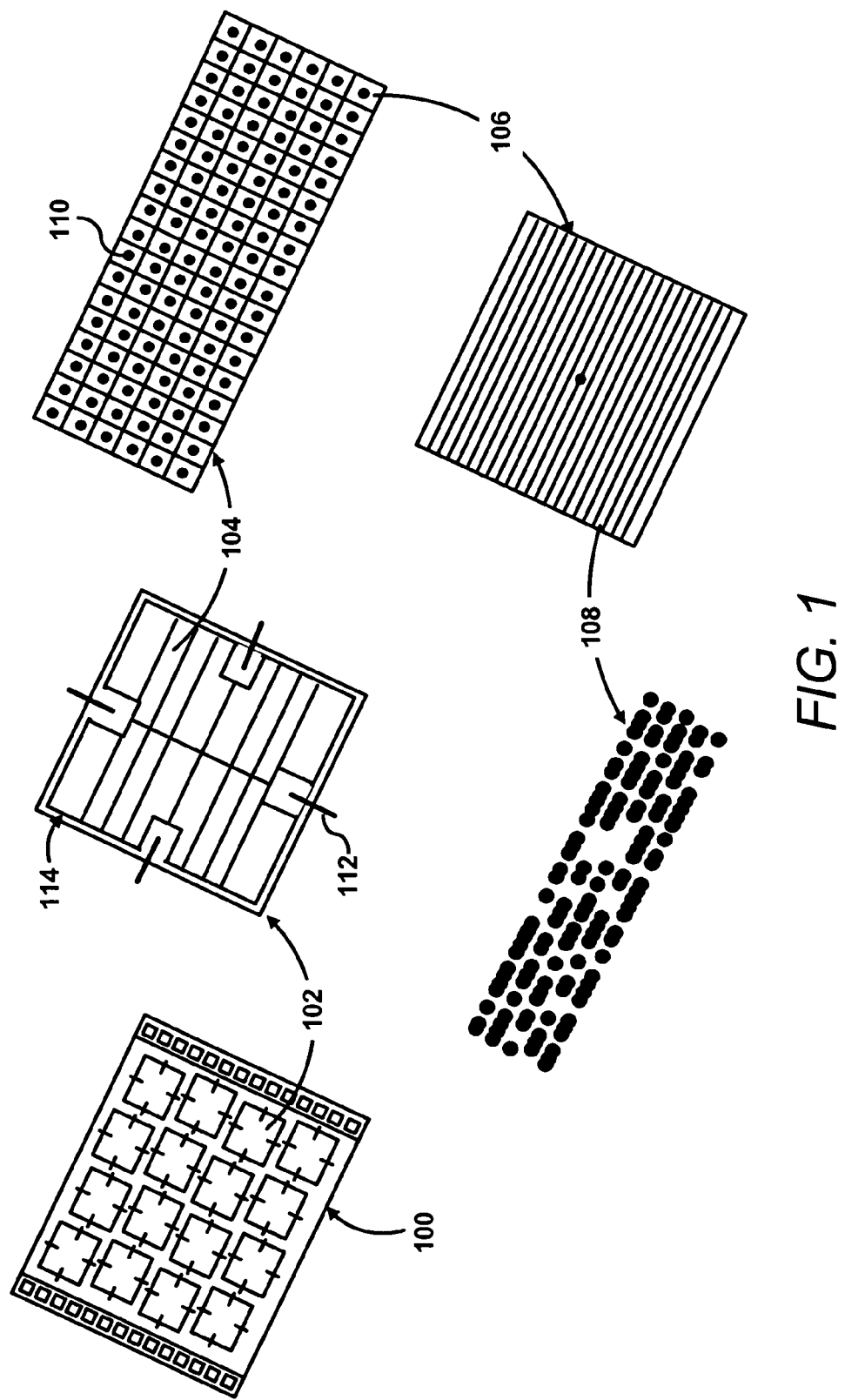
FIG. 1 shows a diagram illustrating a chip including a data storage portion of a plurality of data storage devices, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Data storage devices may include three wafers bonded one on top of the other, with each wafer having micro-electromechanical system (MEMS) features. An example of such a data storage device may be found in co-pending and commonly assigned U.S. patent application Ser. No. 10/700,065, filed on Nov. 3, 2003, the disclosure of which is hereby incorporated by reference in its entirety. As shown in that patent application, the data storage device includes a rectangular area of silicon (storage medium) that is suspended by the center of each of the four sides by silicon flexures (springs). An example of the data storage device is also shown in FIG. 2 of the present disclosure.

Each cantilever offset in the X and Y dimensions is essentially zeroed (nulled) when the format and data is first written on each track of the storage medium. From this event forward, the offset between servo tracks and data tracks is assumed to be a constant and is not compensated for except, for instance, in the case of error recovery.

The MEMS features of the data storage devices, however, may undergo thermal expansion at different rates due to, for instance, the doping of the individual wafers. Another cause for the varying thermal expansion rates may include static or transient thermal gradients from one wafer with respect to the other wafers. Regardless of the cause, the varying rates of expansion may give rise to offsets between the MEMS features of the individual wafers. The offsets may, in turn, cause servo tracking errors due to a reading mechanism moving off track from a data track. Servo tracking errors may compromise read back signals and may cause data to be unintentionally overwritten.

As described herein, the offsets caused by, for instance, varying rates of thermal expansion in the wafers may be detected and techniques may be performed to compensate for the offsets. The offsets may be detected by detecting servo information around at least two corners of a data storage medium of the data storage device. One technique for compensating for the offsets is to vary the position of data storage medium with respect to the reading mechanism in the amount of the detected offset. Another technique is to change the timing at which the reading mechanism is activated in the amount of the detected offset. In addition, the physical data format on the data storage medium may be varied to enable for the compensation for the offset generated by, for instance, thermal expansion changes. Moreover, two or more of the techniques described above may be performed to compensate for the offsets and to thereby enable substantially accurate reading and writing of data bits into the data storage medium.

With reference first to FIG. 1, there is shown a diagram illustrating a chip 100 including a data storage portion of a plurality of data storage devices. It should be readily apparent that the chip 100 depicted in FIG. 1 represents a generalized illustration and that other elements may be added or existing elements may be removed or modified without departing from a scope of the chip 100. For example, the chip 100 may include any reasonably suitable number of micro-movers 102 and should thus not be construed as being limited to the number of micro-movers 102 depicted in FIG. 1.

As shown in FIG. 1, the chip 100 includes a plurality of micro-movers 102. Each of the micro-movers 102 includes a data storage medium 114 divided into a plurality of clusters 104. Each of the clusters 104 includes a plurality of patches 106 and each of the patches 106 includes a plurality of tracks 108. In addition, the clusters 104 are illustrated as being arranged in a horizontally aligned configuration. That is, each of the clusters 104 is illustrated as being substantially parallel with respect to each other. As described in greater detail herein below, in one regard, this arrangement of clusters 104 generally enables the timing at which information is read from or written into the data storage medium 114 to be controlled to thereby compensate for an offset in a micro-mover 102 with respect to a read wafer (216, shown in FIG. 2B). Physical delineations between the clusters 104 and between the patches 106 are for purposes of illustration and are thus not meant to denote that the chip 100 contains those physical delineations.

One example of the chip 100 is shown and described in commonly assigned U.S. Pat. No. 5,557,596, entitled "Ultra-High Density Storage Device", which lists Gary Gibson et al. as the inventors, and the disclosure of which is hereby incorporated by reference in its entirety.

As shown in FIG. 1, the chip 100 includes sixteen micro-movers 102 and the micro-movers 102 each include sixteen clusters 104. The clusters 104 are each illustrated as including one hundred eight patches 106 and the patches 106 as including one thousand (1000) tracks 108. The depiction of the chip 100 including the aforementioned number of micro-movers 102, clusters 104, patches 106, and tracks 108 is for purposes of illustration and is not to be construed as limiting the chip 100 in any respect. In this regard, the chip 100 may include any reasonably suitable number of micro-movers 102, clusters 104, patches 106, and tracks 108 without departing from a scope of the chip 100 disclosed herein.

The chip 100 generally operates as a storage device configured to store information. The information may include, for instance, instructions or other data that may be processed by a processing system, such as, a computer system. The information may also include other types of information, such as, servo information, as described in greater detail herein below. In any regard, the information is stored along the plurality of tracks 108 which run in parallel with each other in each patch 106. A read mechanism 110, such as an electron field emitter configured to generate an electron beam current and sense diode, is associated with each patch 106 and is configured to read and write information along tracks 108 in a respective patch 106. An example of a suitable read mechanism 110 of this type may be found in U.S. Pat. No. 5,557,596.

The read mechanism 110 may alternatively comprise a cantilever section having a tip configured to also read and write information along tracks 108 in a respective patch 106. An example of suitable read mechanism 110 having a cantilevered tip is disclosed in co-pending and commonly assigned U.S. patent application Ser. No. 10/813,477, entitled "Elliptical Shaped Nanoscale Tip", filed on Aug. 9, 2004, which names Donald Fasen et al. as inventors. The disclosure of that patent application is hereby incorporated by reference in its entirety.

Regardless of the type of read mechanism 110 employed, each of the micro-movers 102 includes a plurality of springs 112 configured to cause a position of a micro-mover 102 to be changed or adjusted. In particular, the springs 112 of a micro-mover 102 enable movement of the micro-mover 102 relative to the plurality of read mechanisms 110 to thereby allow information to be read along each of the tracks 108. In this regard, the springs 112 are positioned around the micro-movers 102 to enable the micro-movers 102 to be moved in two dimensions, such that, a single read mechanism 110 may address substantially all of the tracks 108 of a respective patch 106.

The read mechanism 110 may also be configured to write information into the tracks 108 and the positions at which the read mechanism 110 writes information into the tracks 108 may be controlled through movement of a micro-mover 102. Thus, the read mechanism 110 is referred to as a "read" mechanism for purposes of simplicity and is not meant to limit the read mechanism 110 solely to mechanisms configured for reading the tracks 108.

Figure 2A:
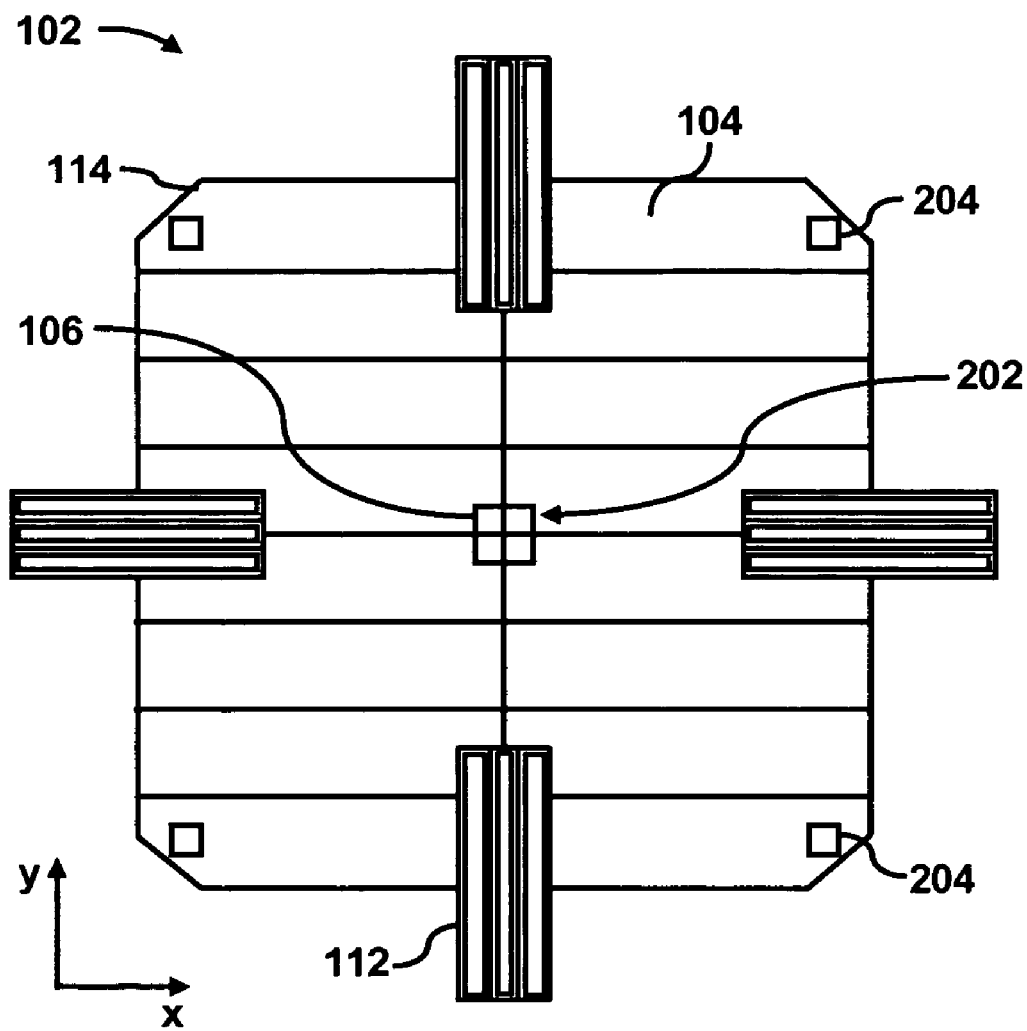
FIG. 2A shows a schematic diagram illustrating in greater detail a set of clusters on a micro-mover, according to an embodiment of the invention.

Referring now to FIG. 2A, there is shown a schematic diagram illustrating in greater detail a set of clusters 104 on a micro-mover 102. As shown, the micro-mover 102 includes a number of data clusters 104 and a servo cluster 202 depicted on a data storage medium 114. The servo cluster 202 includes four patches 106 that include servo information as described herein below. The four patches 106 each have an associated read mechanism 110 configured to read and write the servo information in the respective patches 106. During operation of the micro-mover 102, less than all of the four patches 106 may be employed for position determination. In this regard, the unused patches 106 may be maintained for redundancy and error compensation purposes.

Each of the micro-movers 102 in FIG. 1 may include a servo cluster 202 as just described. The depiction of the micro-movers 102 each including the aforementioned number of clusters 104 and patches 106 is for purposes of illustration and is not to be construed as limiting the micro-movers 102 in any respect. In this regard, the micro-movers 102 may include any reasonably suitable number of clusters 104 and patches 106 without departing from a scope of the micro-movers 102 disclosed herein.

The micro-mover 102 is also illustrated as including reference patches 204 positioned near the outer corners of the micro-mover 102. The reference patches 204 may include one or more patches 106 and may generally operate to include information pertaining to the positioning of the micro-mover 102 with respect to the read mechanisms 110. In one example, the reference patches 204 may include clusters similar to the servo clusters 202 and may thus be configured to write and store position information in respective tracks 108 as servo bits. In another example, the reference patches 204 may include clusters similar to the clusters 104 and may thus be configured to write and store information in respective tracks 108 as data bits. In this example, the data bits may be read and their positions detected to determine the position of the micro-mover 102 with respect to the read mechanisms 110. In addition, the data bits may be tracked in the X and Y directions such that offsets in both directions may be detected.

For purposes of simplicity, the bits contained in the reference patches 204 are described as reference bits. As such, "reference bits", as used throughout the present disclosure should be understood as comprising either or both servo bits and data bits. In addition, although the reference patches 204 have been illustrated to delineate the reference patches 204 from the clusters 104, it should be understood that the delineations are for purposes of illustration and are thus not meant to limit the micro-mover 102 in any respect.

Although the reference patches 204 have been illustrated as being positioned near all four corners of the micro-mover 102, it should be understood that reference patches 204 may be positioned near two corners of the micro-mover 102 without deviating from a scope of the micro-mover 102 depicted in FIG. 2. In certain instances, if two reference patches 204 are employed, the reference patches 204 may be positioned in diagonally opposing corners of the micro-mover 102 to increase the probabilities of detecting positional errors between the micro-mover and the read mechanism 110. In addition, the servo cluster 202 may be included or omitted from the micro-mover 102 without departing from a scope of the micro-mover 102.

In operation, the reference patches 204 may be employed to track the position of the micro-mover 102 in a substantially accurate manner during both normal conditions and in the event of physical changes to at least one of the elements of the chip 100. The physical changes may include, for instance, dimensional changes due to thermal expansion of the elements. These dimensional changes may cause offsets between the relative positions of the read mechanisms 110 and the data storage medium 114 in at least one of the X and Y dimensions due to varying degrees of dimensional changes among the different elements of the chip 100. Through use of the reference patches 204, the level of dimensional change among the different elements may be detected more accurately as compared with use of the centrally located servo clusters 202 alone. The detection of the dimensional changes may be more accurate because the degree of dimensional changes or offsets detected through a comparison of positions detected at two or more corners of the data storage medium 114 is relatively more accurate than the use of a substantially centrally located servo cluster 202 alone. In one respect, control over the movement of the micro-mover 102 may be enhanced to better compensate for the dimensional changes, as described in greater detail herein below.

Figure 2B:
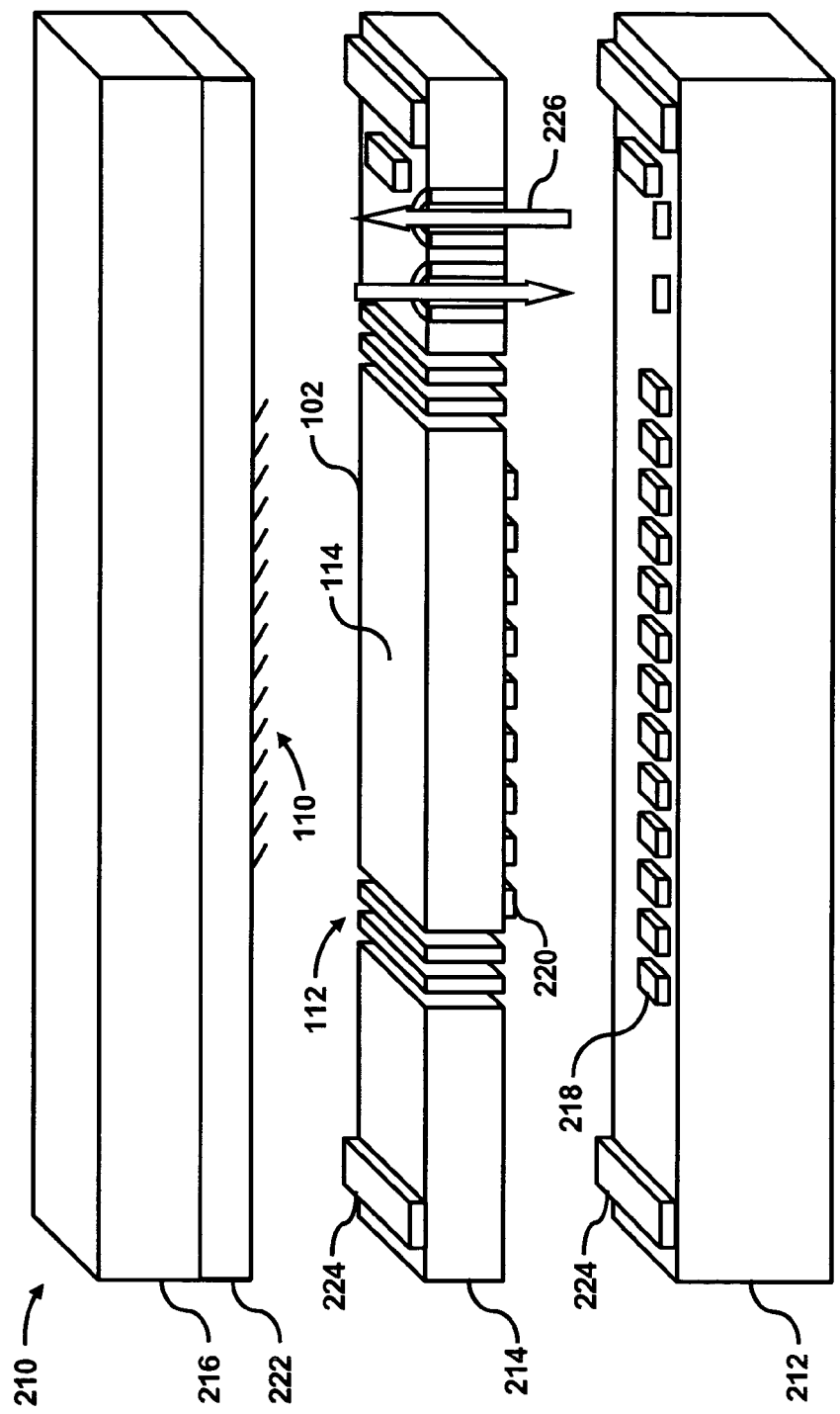
FIG. 2B shows an exploded, perspective view of a memory module, in cross-section, according to an embodiment of the invention.

A more detailed description of the mechanics involved in the movement of the micro-mover 102 is set forth with respect to FIG. 2B. In FIG. 2B, there is shown an exploded, perspective view of a memory module 210, in cross-section. It should be readily apparent that the memory module 210 depicted in FIG. 2B represents a generalized illustration and that other elements may be added or existing elements may be removed or modified without departing from a scope of the memory module 210.

The memory module 210 is depicted as including a stator wafer 212, a rotor wafer 214, and a read wafer 216. The stator wafer 212 includes stator electrodes 218 configured to cause movement of the micro-mover 102 with respect to the read wafer 216 through interaction with rotor electrodes 220 positioned on the lower surface of the micro-mover 102. Although the stator electrodes 218 are illustrated as being positioned along a single dimension (X-dimension), additional stator electrodes 218 may be positioned along a second dimension (Y-dimension) to thus enable the micro-mover 102 to be moved in two dimensions with respect to the read wafer 216.

The read wafer 216 includes cantilevered read mechanisms 110, and various electronics, which are collectively illustrated as electronics 222. The read mechanisms 110 are illustrated as overlying the data storage medium 114 positioned on the micro-mover 102. Thus, as the stator electrodes 218 interact with the rotor electrodes 220 and move the micro-mover 102, the read mechanisms 110 may perform one or both of a read and a write operation at various locations on the data storage medium 114.

The rotor wafer 214 may be hermetically sealed or otherwise sandwiched between the read wafer 216 and the stator wafer 212 through seals 224. The seals 224 may form bond rings around the peripheries of the wafers 212-216 to thus provide a substantially controlled environment within the memory module 210. In addition, the memory module 210 may include connections through the rotor wafer 214 as indicated by the arrows 226. The connections through the rotor wafer 214 may be employed to enable instructions to be communicated between the stator wafer 212 and the read wafer 216. The instructions may include, for instance, manners in which the stator electrodes 218 are to be operated to thus maneuver the micro-mover 102 into desired positions with respect to the read mechanisms 110.

Figure 3:
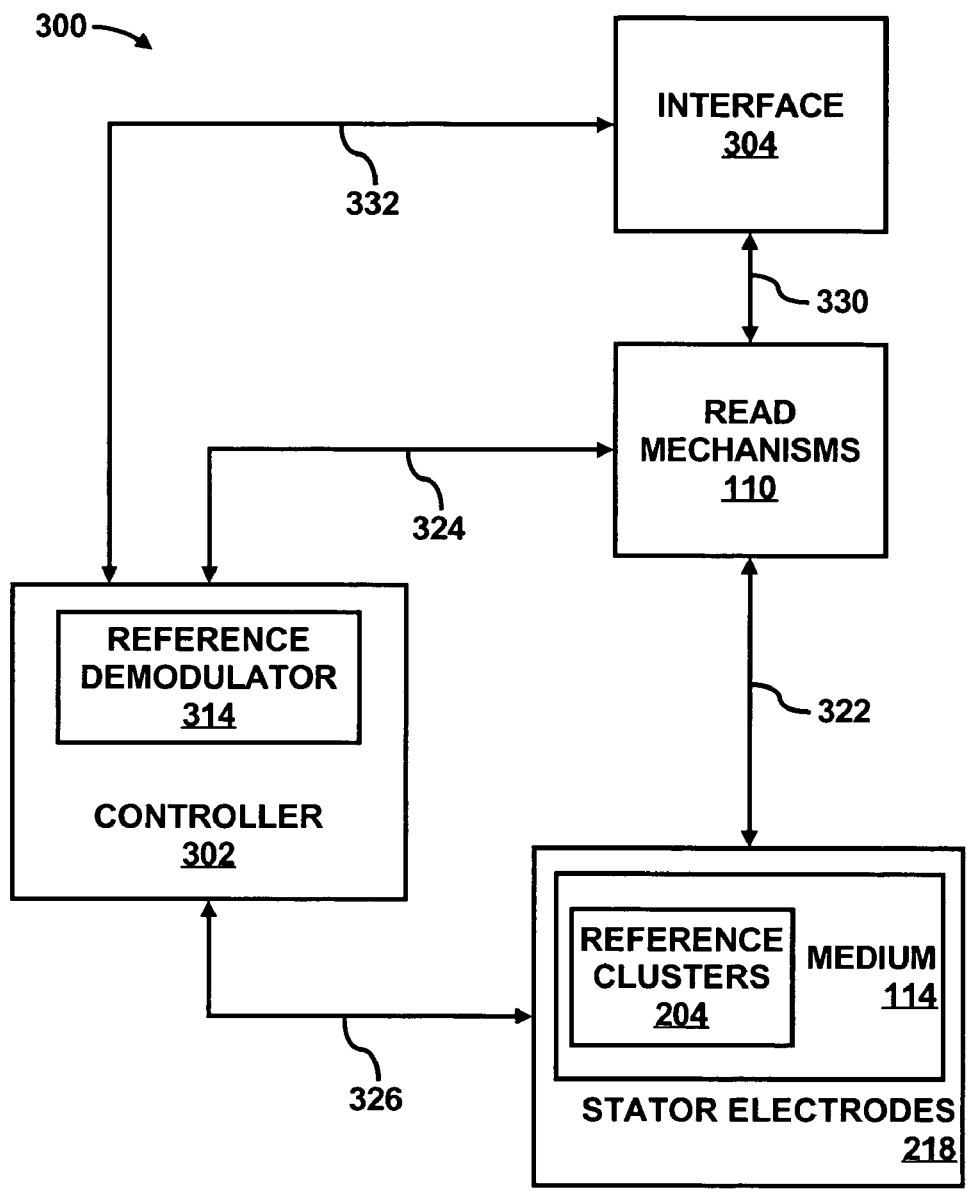
FIG. 3 shows a block diagram illustrating a system of a memory module, such as, the memory module depicted in FIG. 2B, according to an embodiment of the invention.

With reference now to FIG. 3, there is shown a block diagram illustrating a system 300 of a memory module, such as, the memory module 210. It should be understood that the following description of the block diagram 300 is but one manner of a variety of different manners in which such a system 300 may be operated to control operations of a memory module 210. In addition, it should be understood that the system 300 may include additional components and that some of the components described may be removed and/or modified without departing from a scope of the system 300. Moreover, although particular reference is made to the memory module 210 depicted in FIG. 2B, it should be understood that the system 300 may be employed to control memory modules having configurations that differ from that illustrated with respect to the memory module 210.

As shown in FIG. 3, the system 300 includes reference information in reference patches 204. The reference information may comprise information in the form of servo bits or data bits, as described in greater detail herein below. In addition, the reference patches 204 are provided near at least two corners of the data storage medium 114, as also described above. The system 300 also includes stator electrodes 218, read mechanisms 110, a controller 302, and an interface 304.

The data storage medium 114 refers collectively to the clusters 104 and the reference patches 204 as shown in FIGS. 1 and 2A. As such, the data storage medium 114 includes both the data bits and the reference bits, which may both be read and written by the read mechanisms 110, as indicated by the arrow 322.

The read mechanisms 110 are configured to read the reference patches 204 and to provide signals to the controller 302, as indicated by the arrow 324. In general, the controller 302 is configured to control various functions of the memory module 210. In this regard, the controller 302 may comprise a computing device, a microprocessor, a micro-controller, an application specific integrated circuit (ASIC), and the like.

One of the functions of the controller 302 is to control the position of the micro-mover 102. In this regard, the controller 302 includes a reference demodulator 314 configured to generate position and timing information for operations of the stator electrodes 218. More particularly, the reference demodulator 314 is configured to receive signals associated with the reference or position information of the data storage medium 114 from a reading of the reference patches 204 by the read mechanisms 110. In addition, the reference demodulator 314 is configured to generate position and timing information using the signals associated with the reference information.

In one respect, the reference demodulator 314 is configured to provide the position information to the stator electrodes 218 as indicated by the arrow 326. In response to receipt of the position information, the stator electrodes 218 may change or adjust the position of the micro-mover 102, and thus the data storage medium 114, relative to the read mechanisms 110, as will be described in greater detail herein below.

In another respect, the reference demodulator 314 is configured to provide the timing information to the read mechanisms 110, as indicated by the arrow 324. In response to receipt of the timing information, the read mechanisms 110 are configured to determine read and write windows. The read and write windows may comprise time periods for reading from and writing to the data storage medium 114, as will also be described in greater detail hereinbelow.

In operation, the read mechanisms 110 are configured to respond to read and write commands received from an external device using an interface 304, as indicated by the arrow 330. In response to a read or write command, the read mechanisms 110 read from or write to the data storage medium 114, as indicated by the arrow 322. More particularly, the controller 302 may receive signals from the external device through the interface 304 as indicated by the arrow 332. The controller 302 may process the signals and may provide control signals to the interface 304 and to the read mechanisms 110, as indicated by the arrow 324. In addition, the controller 302 may provide control signals to the stator electrodes 218 to move the data storage medium 114 with respect to the read mechanisms 110. In this regard, both the relative positions of the data storage medium 114 and the read mechanisms 110 and the timing at which the read mechanisms 110 are activated may be controlled to perform accurate reading/writing operations.

According to an example, the controller 302, through use of the reference demodulator 314, may detect dimensional changes between, for instance, the data storage medium 114 and the read mechanisms 110. The controller 302 may detect these changes through a comparison of the reference bits (402, FIG. 4) detected in the reference patches 204. The controller 302 may also compensate for these dimensional changes by, for instance, at least one of varying the position of the micro-mover 102 and varying the timing at which the read mechanisms 110 are activated. In one example, the controller 302 may vary the position of the micro-mover 102 to compensate for dimensional changes in the Y-dimension and may compensate for timing changes in the X-dimension. More detailed examples of detection and compensation techniques are described in greater detail herein below.

Figure 4:
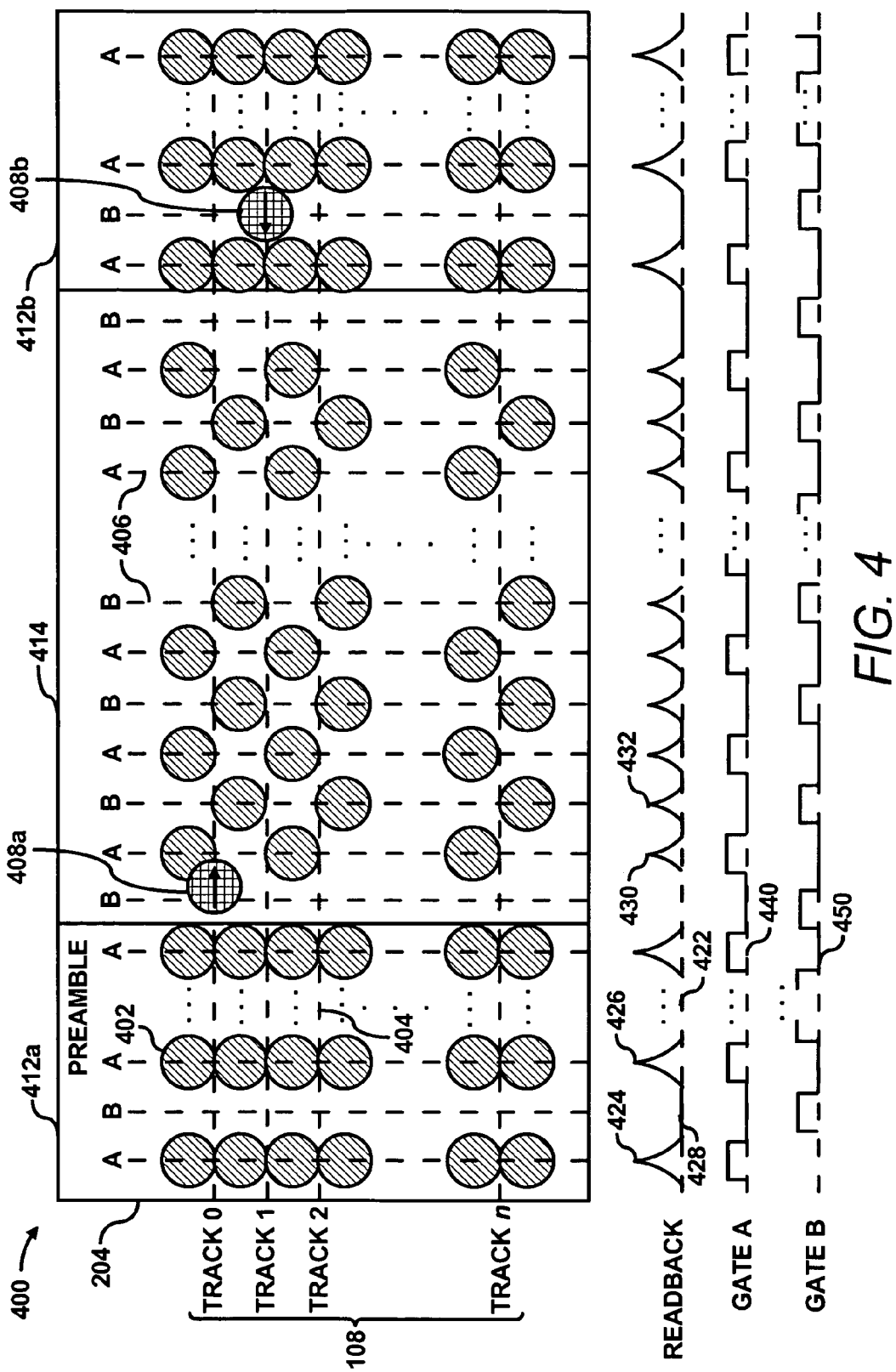
FIG. 4 shows a diagram illustrating an example of reference information, according to an embodiment of the invention.

Turning now to FIG. 4, there is shown a diagram illustrating an example of reference information 400. The reference information 400 is stored on a patch 106 of a reference patch 204 and may be stored on at least two corners of the data storage medium 114. As such, the reference information 400 may include one or both of servo information and data. In any regard, it should be understood that the reference information 400 depicted in FIG. 4 represents a generalized illustration and that other elements may be added or existing elements may be removed or modified without departing from a scope of the reference information 400.

The reference information 400 includes a plurality of reference bits 402 represented by shaded circles and arranged as shown in FIG. 4. More particularly, the reference bits 402 are arranged on both sides of each track 108. The tracks 108 are illustrated as including track 0 through track n, where n is an integer greater than zero. Each of the tracks 108 is represented by a dotted horizontal line 404. The horizontal ellipses (" . . . ") between reference bits 402 indicate that a portion of the horizontal pattern of reference bits 402 is not shown in FIG. 4. The reference bits 402 are also arranged in vertical A and B regions represented by dashed lines 406. The vertical ellipses between certain of the tracks 108 indicate that a number of tracks 108 are not shown in FIG. 4.

Each reference bit 402 represents a region in the data storage medium 114 that is configured to generate an analog signal in response to being read by the read mechanisms 110. The type of analog signal generated in response to reading of the reference bits 402 may depend on the type of data storage medium 114. For instance, if the data storage medium 114 is configured to physically change through receipt of heat from the read mechanisms 110, the reference bits 402 may comprise pits into which the read mechanisms 110 may fall. In this example, the read mechanism 110 may determine the presence of a reference bit 402 through a detection of a change in temperature of the read mechanism 110.

In any case, the read mechanisms 110 may read the reference bits 402 along track 0, for instance, from left to right as represented by the symbol 408a. In addition, the read mechanisms 110 may read the reference bits 402 along track 1, for instance, from right to left as represented by the symbol 408b. The analog feedback signal generated by the read mechanisms 110 moving in either dimension is shown in the graph 422.

The reference information 400 is divided into three regions: two preamble regions 412a and 412b and a track region 414. The graph 422 illustrates the analog signal detected by a read mechanism 110 as it passes over the reference bits 402 in each of these regions. The heights of the peaks of graph 422, such as, peaks 424 and 426, indicate the amplitude of the analog readback signal generated by the read mechanism 110 as it traverses the preamble region 412a.

In the preamble regions 412a and 412b, the read mechanism 110 detects reference bits 402 on both sides of a track 108 as it passes over each successive A region. Accordingly, the analog readback signals generated by the read mechanism 110 in these regions have relatively high peaks, such as, peak 424. The analog readback signal effectively reflects a summation of the reference bits 402 from each side of the track 108. Over the B regions in the preamble regions 412a and 412b, the read mechanism 110 does not detect reference bits 402 on either side of a track 108. Accordingly, the analog readback signal is effectively zero over the B regions as indicated by the zero region 428.

In the track region 414, the read mechanism 110 detects a reference bit 402 on one side of a track 108 at a time as it passes over the successive A and B regions. Accordingly, the analog readback signal generated by the read mechanism 110 in this region has relatively lower peaks, such as, peaks 430 and 432, as compared with the peaks, such as, peaks 424 and 426, in the preamble regions 412a and 412b. The peaks in the track region 414, however, are generated in both the A and B regions as illustrated by the peaks 430 and 432, respectively. Each of the analog readback signal peaks is generated by a single reference bit 402 in the track region 414.

The graphs 440 and 450 each illustrate a timing signal generated from the analog readback signal of the graph 422 and will be described in greater detail herein below with respect to FIG. 6.

Figure 5:
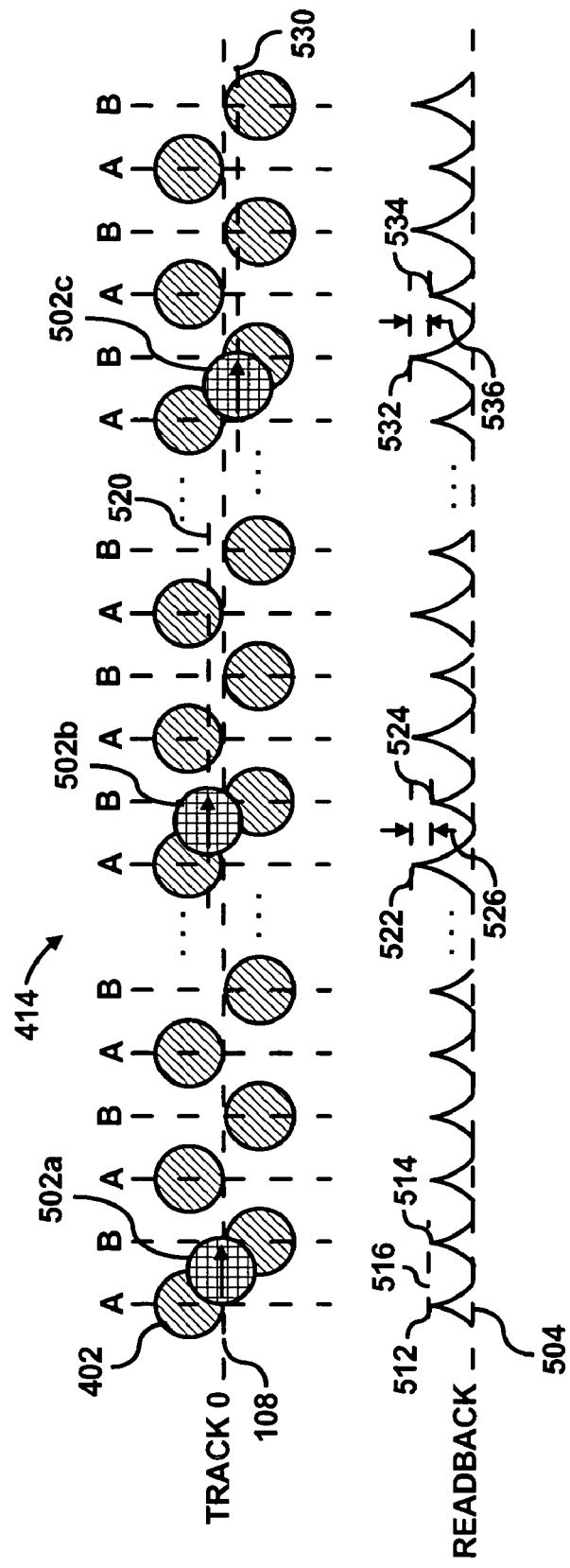
FIG. 5 illustrates an example of a manner in which the reference information depicted in FIG. 4 may be read, according to an embodiment of the invention.

FIG. 5 illustrates an example of a manner in which the reference information 400 may be read. The read mechanism 110 is depicted at three different points 502a, 502b, and 502c along track 108 of the track region 414 shown in FIG. 4. The graph 504 illustrates the analog readback signals generated at each of these points 502a, 502b, and 502c.

At point 502a, the read mechanism 110 is centered on track 108 as it moves along track 108. Accordingly, the read mechanism 110 detects reference bits 402 in the A and B regions equally and the peaks 512 and 514 of the analog readback signal generated by the read mechanism 110 in the A and B regions, respectively, are of equal amplitude as indicated by the dotted line 516.

At point 502b, however, the read mechanism 110 drifts toward the side of the track 108 where the reference bits 402 appear in the A regions as it moves along the track 108. As a result, the read mechanism 110 detects the reference bits 402 in the A regions more strongly than it detects the reference bits 402 in the B regions. As such, the peaks of the analog readback signal in the A regions, such as, peak 522, have higher amplitudes than the peaks in the B regions, such as, peak 524, as indicated by the difference 526 between the peaks 522, 524.

At point 502c, the read mechanism 110 drifts toward the side of the track 108 where the reference bits 402 appear in the B regions as it moves along the track 108. As such, the read mechanism 110 detects reference bits 402 in the B regions more strongly than it detects the reference bits 402 in the A regions. As a result, the peaks of the analog feedback signal in the B regions, such as, peak 532, have higher amplitudes than the peaks in the A regions, such as, peak 534, as indicated by the difference 536 between the peaks 532, 534.

The offsets in the position of the read mechanism 110 from the centered position as shown as point 502a may be caused, for instance, by varying levels of thermal expansion between two or more of the memory module 210 elements. For instance, the offsets, as depicted by points 502b and 502c, may be caused from a greater level of expansion in the read wafer 216 as compared with the micro-mover 102. In addition, the level of offset detected through detection of the reference patches 204 may substantially be greater than an offset detected through detection of the servo cluster 202.

Figure 6:
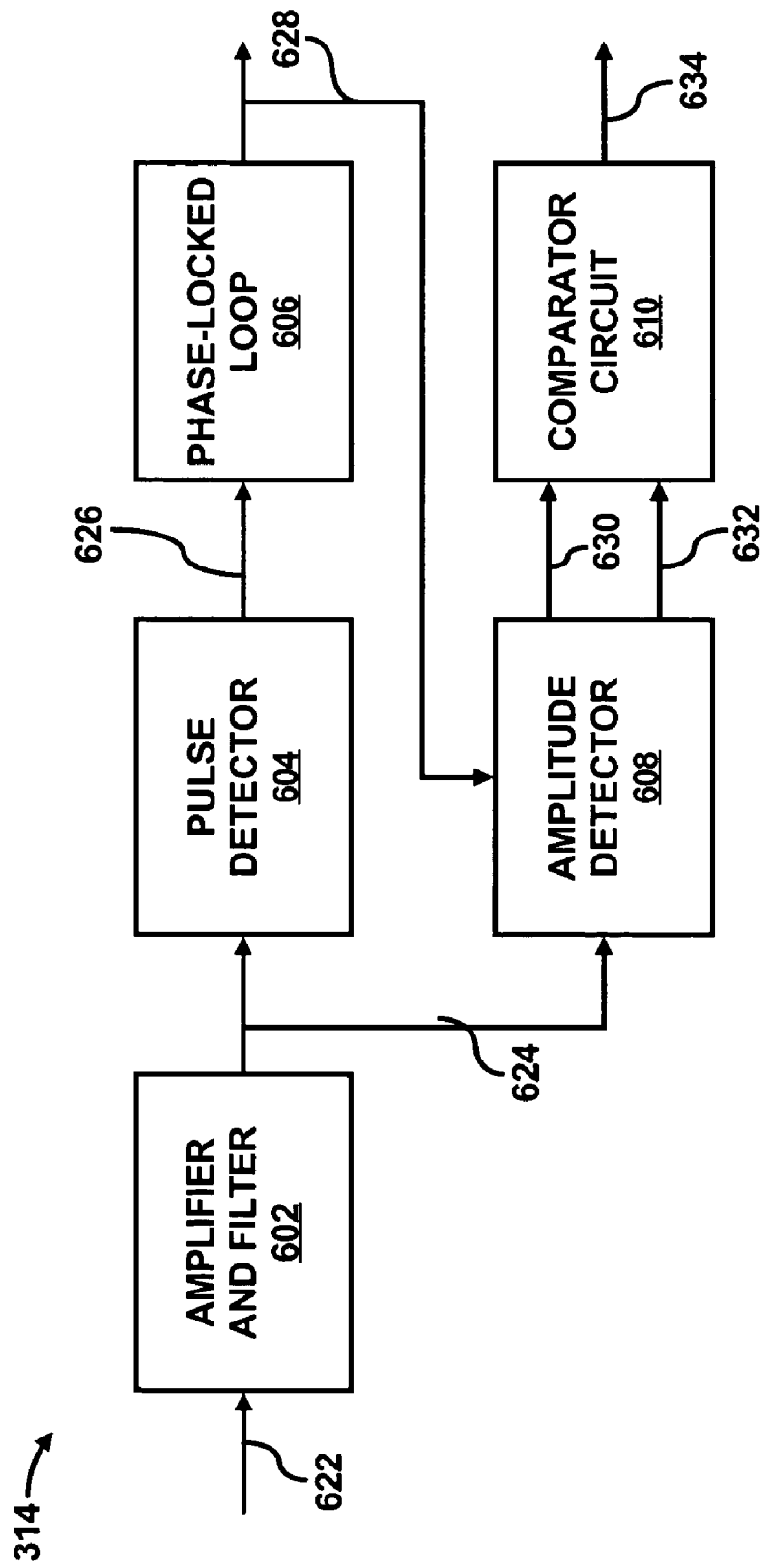
FIG. 6 shows a block diagram illustrating an example of the reference demodulator depicted in FIG. 3, according to an embodiment of the invention.

FIG. 6 is a block diagram illustrating an example of the reference demodulator 314 depicted in FIG. 3. As shown in FIG. 6, the reference demodulator 314 includes an amplifier and filter circuit 602, a pulse detector circuit 604, a digital phase-locked loop circuit 606, an amplitude detector circuit 608, and a comparator circuit 610.

The reference demodulator 314 is configured to receive the analog readback signal from the read mechanism 110, as indicated by the arrow 622. The analog readback signal is provided to the amplifier and filter circuit 602, where the signal is amplified and filtered before being provided to the pulse detector circuit 604 and the amplitude detector circuit 608, as indicated by the arrow 624.

The amplitude detector circuit 608 receives the amplified and filtered signal from the amplifier and filter circuit 602. In response to the amplified and filtered signal and the pulse output signal or signals, the amplitude detector circuit 608 generates an A peak signal and a B peak signal. The A peak signal is associated with reference bits 402 read from the A region of the reference information 400, and the B peak signal is associated with reference bits 402 read from the B region of the reference information 400. The A peak signal and the B peak signal are provided to the summation circuit 610 as indicated by the arrows 630 and 632, respectively. Similarly, the A signal and B signal may be integrated and a comparison may be made between the integrated signal values.

In response to the A peak signal and the B peak signal or their integrated signal values, the comparator circuit 610 generates a difference signal that represents a difference of the A peak signal and the B peak signal. The difference signal is provided to the stator electrode 218 as a position error signal as indicated by the arrow 634.

The position error signal generated by the comparator circuit 610 comprises position information that is used to adjust the position of the micro-mover 102 to generally ensure that the read mechanisms 110 remain centered along tracks 108 as the stator electrode 218 moves the micro-mover 102 relative to the read mechanisms 110. More particularly, the amplitude and polarity of the position error signal may be used to adjust the stator electrode 218, and thereby adjust the position of the micro-mover 102.

With reference back to FIG. 5, when the read mechanism 110 is properly centered on the track 108, the peaks from the A and B regions, such as, peaks 512 and 514, respectively, are approximately equal. Accordingly, the difference between the two peaks is approximately zero and the position error signal will be approximately zero. When the read mechanism 110 is not properly centered on the track 108, however, peaks from the A and B regions are not equal and a difference between the amplitudes of the peaks, such as, the differences indicated by the arrows 526 and 536, will be reflected in the amplitude and polarity of the position error signal. The amount of difference between peaks from the A and B regions indicates the amount of adjustment for the stator electrode 218 to make to move the micro-mover 102, and the polarity of the difference, that is, whether the A peak is larger than the B peak or vice versa, indicates the direction of the adjustment. For example, where the A peaks are larger than the B peaks, the position error signal indicates to the stator electrode 218 to move the micro-mover 102 in one direction and where the B peaks are larger than the A peaks, the position error signal indicates to the stator electrode 218 to move the micro-mover 102 in the opposite direction. In both cases, the adjustment is configured to cause the read mechanisms 110 to be aligned with the centers of the tracks 108.

In this way, the analog readback signal generated by reading the reference information 400 translates into position information that is used by the stator electrode 218 to adjust the position of the micro-mover 102 and thus the data storage medium 114 to generally ensure that the read mechanisms 110 stay nearly centered in the tracks 108.

The amplitude detector circuit 608 may also be configured to detect the timing at which the read mechanism 110 detects the reference bits 402. More particularly, the amplitude detector 608 may determine when a position signal is detected from a reference bit 402 and compare that time to a predetermined time. A difference between the times may indicate an offset in the timing of signal detection from the reference bits 402 (in the X dimension). In this regard, the amplitude detector 608 may also output an indication to the comparator circuit 610 of both the detected time and the predetermined time of the signal detection. The comparator circuit 610 may then generate a difference signal that represents a difference of the two times. The difference signal is provided to the stator electrode 218 as a position error signal in the X-dimension as indicated by the arrow 634.

As such, the analog readback signal generated by reading the reference information 400 translates into position information that is used by the electronics 222 to control the read mechanisms 110 to adjust the timings at which the read mechanisms 110 are activated. In this regard, the timings at which the read mechanisms 110 address their associated data bits in the patches 106 may be varied to compensate for relative positional changes between the read mechanisms 110 and the data storage medium 114 in the X dimension, as described in greater detail herein below with respect to FIG. 7B.

Figure 7A:
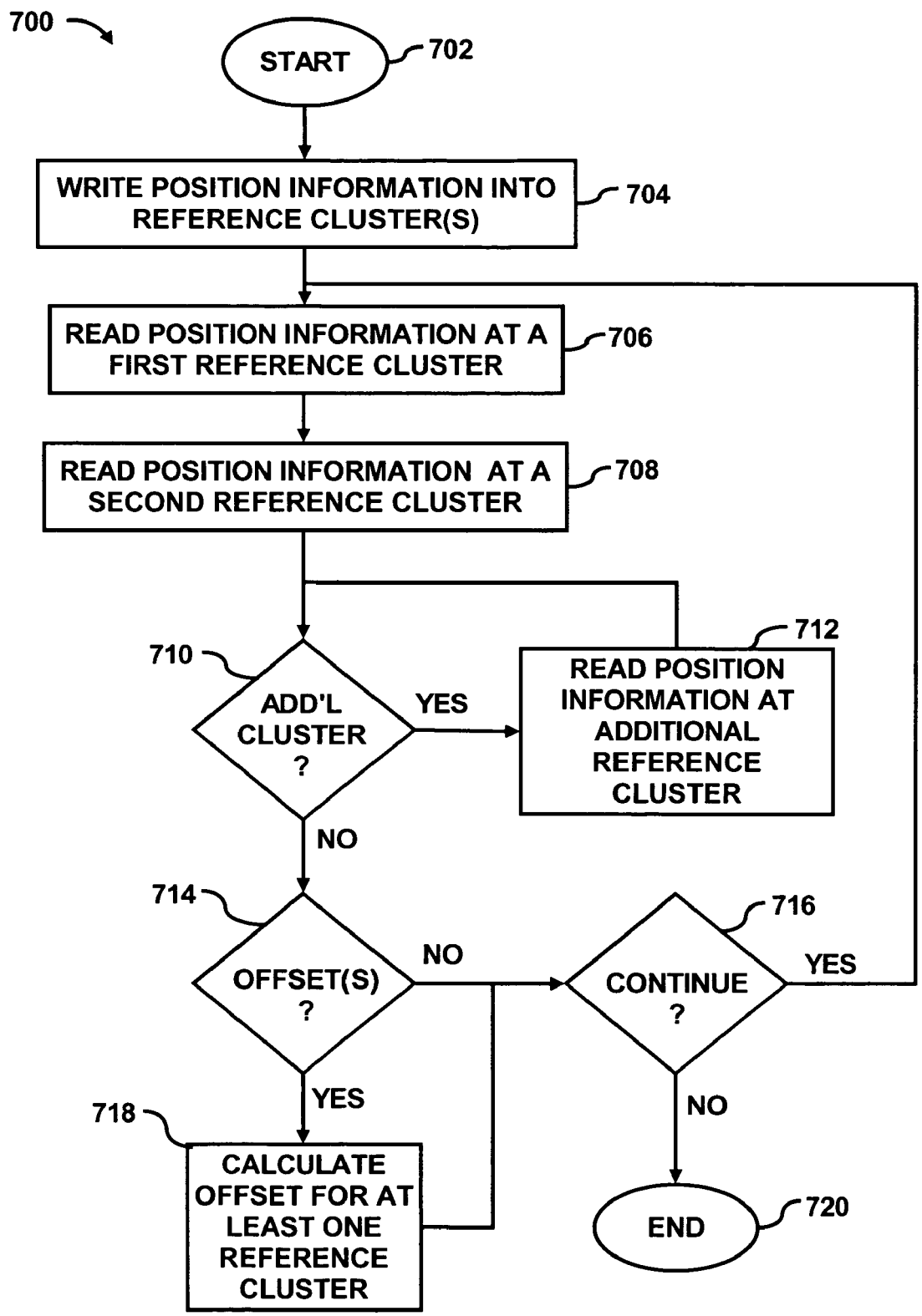
FIG. 7A depicts a flow diagram of an operational mode for detecting an offset between two or more memory module elements, according to an embodiment of the invention.

FIG. 7A depicts a flow diagram of an operational mode 700 for detecting an offset between two or more memory module 210 elements. It is to be understood that the following description of the operational mode 700 is but one manner of a variety of different manners in which an offset between two or more memory module 210 elements may be detected. It should also be apparent to those of ordinary skill in the art that the operational mode 700 represents a generalized illustration and that other steps may be added or existing steps may be removed or modified without departing from a scope of the operational mode 700.

The operational mode 700 may be initiated under a variety of conditions at step 702. For instance, the operational mode 700 may be automatically or manually initiated. In the former case, the operational mode 700 may be performed, for instance, in a substantially continuous manner such that the offsets between the two or more memory module 210 elements are substantially continuously tracked. In the latter case, a user may manually initiate the operational mode 700.

The operational mode 700 may include an optional step 704 of writing position information into at least one reference patch 204. Step 704 is considered optional in the operational mode 700 because the position information may have been written into the at least one reference patch 204 prior to initiation of the operational mode 700. For instance, the position information may be written into the at least one reference patch 204 during an initialization of the memory module 210. In any event, the step of writing the position information into at least one reference patch 204 includes writing the reference bits 402 into the locations of at least one of the reference patches 204 depicted in FIG. 2A. Thus, for instance, the at least one reference patch 204 may include the reference information 400 illustrated in FIG. 4.

At step 706, the position information at a first reference patch 204 may be read. The first reference patch 204 may comprise any of the reference patches 204 illustrated in FIG. 2A. In addition, the position information at the first reference patch 204 may be read through a detection of the positions of the reference bits 402 at the A and B regions of the reference information 400, as described above with respect to the block diagram illustrated in FIG. 6. The position information read at step 706 may yield an offset in either or both of the X and Y dimensions.

At step 708, the position information at a second reference patch 204 may be read. The second reference patch 204 may comprise any of the reference patches 204 illustrated in FIG. 2A other than the first reference patch 204. In certain instances, the second reference patch may be located at a diagonally opposing corner of the data storage medium 114. The position information at the second reference patch 204 may be read through a detection of the positions of the reference bits 402 at the A and B regions of the reference information 400, as described above with respect to the block diagram illustrated in FIG. 6. The position information read at step 708 may also yield an offset in either or both of the X and Y dimensions.

At step 710, it may be determined as to whether position information is to be read from additional reference patches 204. A determination as to whether position information is to be read from additional reference patches 204 may be based upon the layout of the data storage medium 114 or the desired level of accuracy in detecting offsets in the data storage medium 114. In the former case, position information from an additional reference patch 204 may be read if the data storage medium 114 contains an additional reference patch 204. In the latter case, position information from an additional reference patch 204 may be read for greater accuracy in detecting any offsets between the data storage medium 114 and the read mechanisms 110.

If it is determined at step 710 that the position information for an additional reference patch 204 is to be read, the position information at the additional reference patch 204 may be read at step 712. In addition, steps 710 and 712 may be repeated for any additional reference patches 204.

If it is determined that position information at additional reference patches 204 is not required or that there are no additional reference patches 204, it may be determined as to whether there are offsets between the data storage module 114 and the read mechanisms 110 at step 714. If it is determined that there are no offsets, it may be determined as to whether the operational mode 700 is to be continued at step 716. A determination to continue the operational mode 716 may be made if it is desired that offsets between the data storage module 114 and the read mechanisms 110 be continuously tracked. Alternatively, a determination to discontinue the operational mode 700 may be made at step 716, for instance, if the operational mode 700 is programmed to run for a predetermined number of iterations or a predetermined period of time and those periods have expired. In addition, the operational mode 700 may be manually discontinued.

If, however, at step 714, it is determined that an offset exists between the data storage medium 114 and the read mechanisms 110, the offset for at least one of the reference patches 204 may be calculated at step 718. The offset may be calculated in both the X and Y dimensions. In addition, the offset may be calculated in a number of different manners. In a first example, the offset in either or both of the X and Y dimensions may be calculated based upon a comparison between any offsets determined at the first reference patch 204 and the second reference patch 204. Thus, for instance, if it is determined that the offset detected at the first cluster is n nanometers in a positive Y dimension and the offset detected at the second cluster is m nanometers in a negative Y dimension, the total offset between the data storage medium 114 and the read mechanisms 110 is n+m nanometers. In other words, for instance, this total offset indicates that the relative dimensions in the Y dimension of the data storage medium 114 and the read mechanisms 110 has changed by n+m nanometers.

In instances where an offset at an additional reference patch 204 is determined, that offset may also be taken into consideration in determining the total offset at step 718. As such, the total offset may factor any offsets in the X and Y dimensions detected at the additional reference patch 204.

Figure 7B:
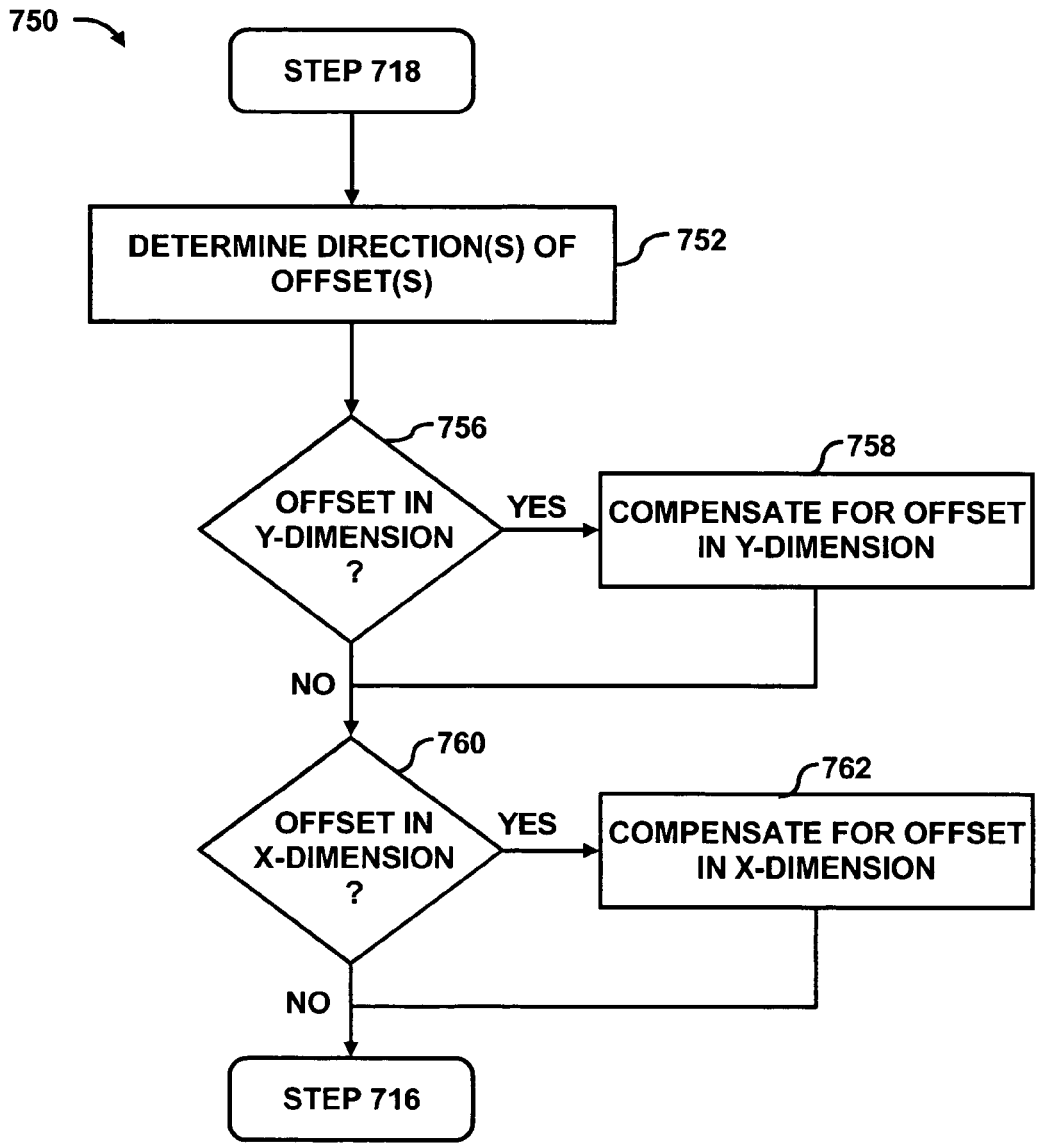
FIG. 7B depicts a flow diagram of an operational mode for compensating for the offsets determined through implementation of the operational mode shown in FIG. 7A, according to an embodiment of the invention.

In any respect, the data storage device 210 may compensate for the offsets such that errors in reading from and writing data bits into the data storage medium 114 may substantially be reduced or eliminated. An example of an operational mode for compensating for the offsets is described with respect to FIG. 7B. More particularly, FIG. 7B is a flow diagram of an operational mode 750 for compensating for the offsets determined through implementation of the operational mode 700. In one respect, the operational modes 700 and 750 may be collectively considered as an operational mode for operating a data storage device.

As shown in FIG. 7B, the operational mode 750 is initiated following the calculation of the total offset at step 718. Although the total offsets have been described as being calculated at step 718, the dimensions (X and Y) of the offsets may also have been determined at step 718. However, if the dimensions of the offsets have not been determined at step 718, this may be determined as indicated at step 752.

At step 756, it may be determined as to whether the relative position of the data storage medium 114 with respect to the read mechanisms 110 is offset in the Y dimension. If there is an offset in the Y dimension, the offset may be compensated for as indicated at step 758. For instance, the stator electrodes 218 may be operated to move the micro-mover 102 a distance equal to and opposite in direction to the offset in the Y dimension. With reference back to FIG. 2A, because the clusters 104 are arranged in parallel rows in the X dimension, a shift in the position of the micro-mover 102 in the Y dimension will cause the same shift in distance between the read mechanisms 110 and their respective clusters 104. In the event that the offset in the Y dimension is consistent throughout the entire data storage medium 114, a single shift in the position of the micro-mover 102 in the Y dimension may be sufficient to compensate for the offset.

However, if it is determined at step 718 that the level of offset varies for various portions of the data storage medium 114, an alternative compensation technique may be performed. In this case, the position of the micro-mover 102 may be shifted to a first distance to perform read and write operations at a first area of the data storage medium 114, a second distance to perform read and write operations at a second area of the data storage medium 114, and so forth, at step 758. As such, the timing at which data is read from or written into the data storage medium 114 may be varied such that these operations are performed when the read mechanisms 110 are substantially centered with their respective tracks 108.

For instance, if the lower left corner of the micro-mover 102 is the reference point and an offset in the Y dimension is determined to be N nanometers, the patches 106 located ¾ of the total height of the micro-mover 102 will have an offset equal to +(¾)N nanometers, assuming that the offset is linear throughout the micro-mover 102. As such, to accurately address the patches 106 located ¾ of the total height, the micro-mover 102 would have to be shifted −(¾)N nanometers in the Y dimension. In addition, the micro-mover 102 would have to be shifted in this manner for the patches 106 located at various heights along the micro-mover 102 to thereby compensate for the offsets at the various heights. To further enhance the compensation and operations of the micro-movers 102, the read mechanisms 110 that are active during a single read or write operation may be located along the same horizontal row.

Following either of steps 756 or 758, it may be determined as to whether the relative position of the data storage medium 114 with respect to the read mechanisms 110 is offset in the X dimension, at step 760. If there is an offset in the X dimension, the offset may be compensated for as indicated at step 762. Compensation for an offset in the X dimension may be made by adjusting the timing at which the reference bits 402 are detected. Thus, for instance, if it is determined that an offset in the X dimension in the amount of t nanometers exists between the data storage medium 114 and the read mechanisms 110, the timing at which the read mechanisms 110 are activated to perform read or write operations may be accelerated or delayed by the time it takes for the micro-mover 102 to move the t nanometers.

Again, with reference back to FIG. 2A, because the clusters 104 are arranged in parallel rows in the X dimension, a shift in the timing at which the read mechanisms 110 are activated will cause the same shift between the read mechanisms 110 and their respective clusters 104. In the event that the offset in the X dimension is consistent throughout the entire data storage medium 114, a single shift in the timing at which the read mechanisms 110 are activated may be sufficient to compensate for the offset.

However, if it is determined at step 718 that the level of offset varies for various portions of the data storage medium 114, an alternative compensation technique may be performed. In this case, the timing at which the read mechanisms 110 are activated may be shifted by a first time to perform read and write operations at a first area of the data storage medium 114, a second time to perform read and write operations at a second area of the data storage medium 114, and so forth, at step 762. As such, the timing at which data is read from or written into the data storage medium 114 may be varied such that these operations are performed when the read mechanisms 110 are substantially centered with their respective tracks 108.

By way of example, if the lower left corner of the micro-mover 102 is considered as the reference point and an offset in the X dimension is determined to be N nanometers, the patches 106 located ¾ of the total length in the X dimension of the micro-mover 102 will have an offset equal to a timing offset corresponding to +(¾)N nanometers from the reference point, assuming that the offset is linear throughout the micro-mover 102. As such, to accurately address the patches 106 located ¾ of the total length from the reference point, the timings at which the read mechanisms 110 are activated would have to be shifted in the X dimension according to the respective distances of the read mechanisms 110 from the reference point. For instance, multi-phase clocks may be employed to control the timings at which the read mechanisms 110 are activated. More particularly, clocks that most accurately provide discrete time phases corresponding to the distance from the reference point may be used to control the timings at which the read mechanisms 110 are activated to thereby compensate for timing offsets.

Following either of steps 760 or 762, the operational mode 750 may end and it may be determined whether the operational mode 700 is to continue as described above with respect to step 716. By continuing to perform the operational modes 700 and 750, the relative positions between the data storage medium 114 and the read mechanisms 110 may be continuously monitored and the memory module 210 may be operated in manners to compensate for detected offsets.

Some or all of the operations illustrated in the operational modes 700 and 750 may be contained as a utility, program, or a subprogram, in any desired computer accessible medium. In addition, the operational modes 700 and 750 may be embodied by a computer program, which may exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A data storage device comprising:
a first read mechanism;
a second read mechanism;
a data storage medium movable with respect to the first read mechanism and the second read mechanism;
a first reference patch positioned substantially at a first corner of the data storage medium, the first reference patch containing reference bits disposed along both sides of at least one track, wherein the first read mechanism is configured to read the reference bits of the first reference patch as said first read mechanism travels along said at least one track;
a second reference patch containing reference bits disposed along both sides of at least one track, the second read mechanism being configured to read the reference bits of the second reference patch as said second read mechanism travels along said at least one track of said second reference patch; and
a controller configured to determine whether the first read mechanism and the data storage medium are offset with respect to each other based upon the reference bits read by the first read mechanism and the reference bits read by the second mechanism.

2. The data storage device according to claim 1, further comprising:
a mover, wherein the data storage medium is positioned on the mover, and wherein the controller is configured to move the mover a distance to thereby change the position of the data storage medium with respect to the first read mechanism and the second read mechanism; and
wherein the controller is further configured to move the mover in response to a determination that the first read mechanism and the data storage medium are offset with respect to each other to thereby compensate for the offset.

3. The data storage device according to claim 2, further comprising:
a plurality of data read mechanisms;
wherein the data storage medium comprises a plurality of data patches, said plurality of data patches comprising data bits arranged in data tracks set along a first dimension, wherein each of the plurality of data read mechanisms is associated with one of the plurality of data patches, and wherein the plurality of data read mechanisms is configured to read the data bits of a data patch to which each of the plurality of data patches are respectively associated.

4. The data storage device according to claim 2, wherein the controller is further configured to determine an offset in at least one or both of a first dimension and a second dimension, wherein the first dimension is substantially perpendicular to the second dimension, and wherein the controller is configured to move the mover a distance to compensate for an offset in the second dimension.

5. The data storage device according to claim 4,
wherein the controller is further configured to control timings at which the plurality of data read mechanisms are activated to read the data bits, to thereby compensate for an offset in the second dimension.

6. The data storage device according to claim 1, wherein the second reference patch is positioned substantially at a second corner of the data storage medium, which is located diagonally across from the first corner of the data storage medium.

7. The data storage device according to claim 1, wherein the second reference patch comprises a servo patch and is positioned substantially at a center of the data storage medium.

8. The data storage device according to claim 1, further comprising:
a read wafer, wherein the first read mechanism and the second read mechanism are positioned on the read wafer; and
wherein the controller is configured to calculate a total offset between the read wafer and the data storage medium based upon a sum of the individual offsets detected by the first read mechanism and the second read mechanism.

9. The data storage device according to claim 1, further comprising:
a third read mechanism;
a third reference patch positioned substantially at a third corner of the data storage medium, said third reference patch containing reference bits disposed along both sides of at least one track, wherein the third read mechanism is configured to read the reference bits of the third reference patch as said third read mechanism travels along said at least one track of said third reference patch;
a fourth read mechanism;
a fourth reference patch positioned substantially at a fourth corner of the data storage medium, said fourth reference patch containing reference bits disposed along both sides of at least one track, wherein the fourth read mechanism is configured to read the reference bits of the fourth reference patch as said fourth read mechanism travels along said at least one track of said fourth reference patch; and
wherein the controller is further configured to determine whether at least one of the first read mechanism, the second read mechanism, the third read mechanism, and the fourth mechanism are offset with respect to the data storage medium based upon the reference bits read by the first read mechanism, the second read mechanism, the third read mechanism, and the fourth read mechanism.

10. A method for operating a data storage device having a data storage medium and read mechanisms, said method comprising:

reading reference bits disposed along both sides of at least one track in a first reference patch located substantially at a first corner of the data storage medium with a first read mechanism;

reading reference bits disposed along both sides of at least one track in a second reference patch located substantially at a second corner of the data storage medium with a second read mechanism; and determining whether any offsets exists between the first reference patch and the first read mechanism and the second reference patch and the second read mechanism based upon the reference bits read at the first reference patch and the second reference patch.

11. The method according to claim 10, further comprising:
calculating an offset in at least one of a first dimension and a second dimension between the first reference patch and the first read mechanism and the second reference patch and the second read mechanism in response to a determination that an offset exists between the first reference patch and the second reference patch, and wherein the first dimension is substantially perpendicular to the second dimension.

12. The method according to claim 11, further comprising:
moving the data storage medium in the first dimension to compensate for the offset calculated between at least one of the first reference patch and the first read mechanism and the second reference patch and the second read mechanism.

13. The method according to claim 12, wherein the step of moving the data storage medium further comprises moving the data storage medium a first distance in the first dimension to compensate for the offset at a first location on the data storage medium and moving the data storage medium a second distance in the first dimension to compensate for the offset at a second location on the data storage medium, wherein the first distance and the second distance correspond to the positions of the first location and the second location with respect to a reference location.

14. The method according to claim 13, wherein the data storage device includes data read mechanisms, wherein the data storage medium comprises data patches, each of said data patches comprising data bits, and wherein the data read mechanisms are configured to read the data bits of associated data patches, the method further comprising:
activating data read mechanisms positioned along the second dimension at the first location when the data storage medium is moved the first distance; and
activating data read mechanisms positioned along the second dimension at the second location when the data storage medium is moved the second distance.

15. The method according to claim 11, wherein the data storage device includes data read mechanisms, wherein the data storage medium comprises data patches, each of said data patches comprising data bits, and wherein the data read mechanisms are configured to read the data bits of associated data patches, the method further comprising:
controlling timings at which the data read mechanisms are activated to read the data bits to compensate for offsets in the second dimension.

16. The method according to claim 15, wherein the step of controlling timings at which the data read mechanisms are activated further comprises shifting the time at which a first data read mechanism is activated by a first time and shifting the time at which a second data read mechanism is activated by a second time, wherein the first time and the second time correspond to the positions of the first data read mechanism and the second data read mechanism with respect to a reference location.

17. The method according to claim 16, wherein the step of shifting the time further comprises controlling the first data read mechanism with a first clock and controlling the second data read mechanism with a second clock.

18. The method according to claim 10, further comprising:
calculating a total offset equal to a sum of the offsets calculated between the first reference patch and the first read mechanism and the second reference patch and the second read mechanism.

19. The method according to claim 18, further comprising:
moving the data storage medium in the first dimension to compensate for the total offset; and
controlling a timing at which a data read mechanism is activated to read data bits contained in a data patch of the data storage medium to compensate for the offset in the second dimension.

20. The method according to claim 10, further comprising:
reading reference bits disposed along both sides of at least one track in a third reference patch located substantially at a third corner of the data storage medium with a third read mechanism; and
determining whether any offsets exist at the third reference patch based upon to the reference bits read at the third read mechanism.

21. A system for storing information, said system comprising:
means for reading reference bits disposed along both sides of at least one track in a first reference patch located substantially at a first corner of a data storage medium;
means for reading reference bits disposed along both sides of at least one track in a second reference patch located substantially at a second corner of the data storage medium;
means for detecting position errors detected from at least one of the means for reading reference bits in the first reference patch and the means for reading reference bits in the second reference patch; and
means for compensating for position errors detected by the means for detecting.

22. A non-transitory computer readable storage medium on which is embedded one or more computer programs, said one or more computer programs implementing a method for operating a data storage device having a data storage medium and read mechanisms, said one or more computer programs comprising a set of instructions for:
reading reference bits disposed along both sides of at least one track in a first reference patch located substantially at a first corner of the data storage medium with a first read mechanism;
reading reference bits disposed along both sides of at least one track in a second reference patch located substantially at a second corner of the data storage medium with a second read mechanism;
determining whether any offsets exists between the first reference patch and the first read mechanism and the second reference patch and the second read mechanism based upon the reference bits read at the first reference patch and the second reference patch; and
compensating for offsets between the first reference patch and the first read mechanism and the second reference patch and the second read mechanism.

* * * * *